United States Patent

[11] 3,615,188

| [72] | Inventors | Herman W. Kouwenhoven;<br>Martinus J. L. Van Beem, both of<br>Amsterdam, Netherlands |
|---|---|---|
| [21] | Appl. No. | 757,767 |
| [22] | Filed | Sept. 5, 1968 |
| [45] | Patented | Oct. 26, 1971 |
| [73] | Assignee | Shell Oil Company<br>New York, N.Y. |
| [32] | Priority | Sept. 29, 1967 |
| [33] | | Netherlands |
| [31] | | 6713254 |

[54] PROCESS FOR THE PREPARATION OF MORDENITE
8 Claims, No Drawings

[52] U.S. Cl. .................................... 23/113,
252/455 Z
[51] Int. Cl. ................................. C10b 33/28,
B01j 11/40
[50] Field of Search .......................... 252/455 Z;
23/113

[56] References Cited
UNITED STATES PATENTS

| 3,436,174 | 4/1969 | Sand ............................. | 23/113 |
| 3,190,939 | 6/1965 | Benesi .......................... | 252/455 UX |
| 3,227,660 | 1/1966 | Hansford ...................... | 252/455 |
| 3,422,033 | 1/1969 | Ballard, Jr. et al. ............ | 252/455 |

*Primary Examiner*—Daniel E. Wyman
*Assistant Examiner*—C. F. Dees
*Attorney*—Harold L. Denkler ABSTRACT: A method of preparing mordenite by hydrothermal treatment of a silica-alumina cogel prepared by precipitation of alumina on a silica gel (as opposed to a coprecipitate) in which the cogel is heated in an alkali solution having excess alkali (calculated basis the alkali-metal oxide), the total amount of alkali being equal to $Ax/102 + by/1000$, where $A$ is the molecular weight of the alkali oxide, $x$ is the weight of alumina in the cogel, in grams; $y$ is the weight of water in the total solution, in grams; and $b$ is the weight, in milligrams, of excess alkali (basis a molar alkali-alumina ratio of 1 per gram of water and is in a range between 7–30 milligrams per gram of water.

PROCESS FOR THE PREPARATION OF MORDENITE

BACKGROUND OF THE INVENTION

1. Field of the Invention

The invention relates to a process for the preparation of mordenite with a high degree of purity.

2. Discussion of the Prior Art

Synthetic zeolites are employed as selective adsorbents, as desiccants, and as carriers for catalysts for catalytic processes of divergent nature. For these applications it is desirable that the synthetic zeolites possess a high degree of purity, i.e., that they contain as little as possible of amorphous base materials. Customarily, zeolites are prepared by alkaline treatment of amorphous silica-alumina mixtures at elevated temperature and pressure. However, synthetic zeolites as customarily prepared are often contaminated with crystalline material of a different crystalline structure and with amorphous base materials. Synthetic mordenite is often contaminated with analcite.

Mordenite belongs to the groups of crystalline aluminosilicates (zeolites) and has a high silica content. Its general composition is $1.0\pm0.2 Me_{2/n}O \cdot Al_2O_3 \cdot 10\pm0.5 SiO_2$, in which Me represents an alkali metal ion, such as sodium or potassium, or an alkaline earth metal ion, such as calcium, and $n$ is the valency of that ion. The mordenite may occur either in hydrated or in dehydrated form, while the metal ion (Me) may be exchanged for other metal ions, a hydrogen ion or an ammonium ion. Mordenite has recently become highly popular, in particular because of its applicability as a catalyst carrier for isomerization catalysts or for hydrocracking catalysts. Although various methods for the preparation of synthetic mordenite are known from the literature, all have the disadvantage that the product obtained does not consist of a high percentage of crystalline mordenite and/or is contaminated with crystalline material of a different crystalline structure and composition. Moreover, reproducible results are difficult to obtain, making preparation methods less than satisfactory for large-scale commercial application.

The object of the present invention is the preparation of mordenite which possesses a high crystallinity having minimum contamination with crystalline material of a different crystalline structure and composition. A further object of the invention is to provide a process that yields reproducible mordenite purity. These objects are attained by subjecting a silica-alumina cogel under autogenous pressure to a hydrothermal treatment.

SUMMARY OF THE INVENTION

This invention is a process for preparing synthetic mordenite comprising:

1. Preparation of a cogel of aluminum hydroxide on silica hydrogel having a molar silica-alumina ratio from about 9.5 to 12.5, and 2. Heating the cogel under autogenous pressure in an aqueous alkaline solution having an alkali metal content, expressed as weight alkali metal oxide, $Me_2O$, in grams equal to $Ax/102 + by/1,000$, where A is the molecular weight of the $Me_2O$; ti x is the weight of alumina in the cogel, in grams; $y$ is the weight of water in the total solution, in grams; and $b$ is the weight, in milligrams, of alkali (basis a molar alkali-alumina ratio of 1) in excess per gram of water and is in a range between 7–30 milligrams per gram of water.

In the process according to the invention it is essential that a cogel of aluminum hydroxide on silica hydrogel be used which, after separation and drying, is heated with a certain quantity of alkali solution consisting of an excess amount of alkali over that required to satisfy the molar composition of finished mordenite.

The term "cogel" in the specification and claims is used to indicate a silica-alumina mixture that has been obtained by precipitating an aluminum-hydroxide gel on silica hydrogel. Therefore, a cogel thus defined is not a coprecipitate, since in the preparation of a coprecipitate silica hydrogel and aluminum hydroxide gel are simultaneously or nearly simultaneously precipitated from the solution.

The amount of alkali that must be present in the aqueous alkaline solution to be heated, is primarily dependent upon the quantity of cogel used. The minimum amount of alkali which should be present is determined by the general mordenite composition having a $Me_{2/n}O:Al_2O_3$ ratio of $1\pm0.2$. An additional amount of alkali is required which is not taken up in the mordenite crystal lattice, but which promotes the conversion into mordenite. It has been found that this additional quantity is only variable within rather narrow limits, and beyond these limits either no crystalline product is formed or analcite is formed as a contaminant.

As mentioned above, the total amount of alkali used, expressed as grams $Me_2O$, must satisfy the relation $(A.x/102 + b.y/)$. This relation is based on a molar alkali-alumina ratio of 1 in the mordenite. The quantity $b.y/1,000$ is the extra amount of alkali required. Of this quantity, $b$ is the amount of alkali, in milligrams, which is present in excess of water in the total solution to be heated; $b$ has a value which ranges between 7 and 30 mg./g. and preferably between 10 and 20 mg./g. at a molar alkali-alumina ratio of 1.

In the relation as defined, $y$ is the amount of water (in grams) in the total liquid solution. It has been found that a certain minimum quantity of water must be present during the hydrothermal treatment. This minimum quantity of water is determined by a water-alumina molar ratio which must be at least 50. This ratio preferably ranges between 75 and 175, and in particular between 95 and 150. However, water-alumina molar ratios of up to 200 may be used, although no improvement in crystalline product yield will be obtained. Water quantities below a molar ratio of 50 results in a cogel paste which is difficult to heat and causes insufficient conversion to mordenite.

When calculating the total gram amount of water in the total solution to be heated—the factor $y$—it is necessary to take into account, not only the amount of liquid that has been added to the alkaline solution, but also the water of hydration of the silica-alumina cogel and the water content of the alkali hydroxide used and expressed as $Me_2O \cdot H_2O$. The percentage of water of the cogel can be determined in a simple way as loss of weight on ignition. In the examples, the mole quantity of water is based on the water of the solution, the hydrate water and the water present in the weighed amount of alkali $Me_2O$ added.

Alkaline compounds, $Me_2O$, suitable for the process are alkali metal hydroxides, such as sodium hydroxide and potassium hydroxide. These compounds are preferred, since Na and K ions can easily replace each other in the mordenite crystal lattice. Mixtures of these alkaline compounds may also be used.

It has been found that when a coprecipitate of silica hydrogel and aluminum hydroxide rather than a cogel is heated with alkali very little, if any, mordenite is formed in an equivalent heating time. Processes for preparing mordenite previously known use amorphous coprecipitates of alkali metal oxide, silica and alumina because it was supposed that an intimate mixture of the three components was required for the formation of the crystalline product. The discovery that a cogel as defined can be used is thus all the more surprising since it must be assumed that the cogel silica globules are covered by a thin layer of alumina, while the third component that is required, the alkali, is virtually absent from the cogel.

Another advantage of using a cogel according to the invention is that it has a very low alkali content, usually less than 0.1 percent $w$. The alkali content in the cogel can easily be reduced to 0.1 percent $w$. or lower by washing with distilled water. It is then possible to adjust the concentration of the alkaline liquid for the hydrothermal treatment to the desired value without the necessity for accounting for alkali present in the amorphous silica-alumina starting material. Thus more precise control is possible.

The $SiO_2/Al_2O_3$ molar ratio of the amorphous silica-alumina cogel should be within the limits of 9.5 and 12.5 and preferably between 10.0 and 20.0 At $SiO_2/Al_2O_3$ molar ratios lower than about 10.0, preparation of mordenite with a high degree of purity is difficult since insufficient silica present in the total liquid to be subjected to a hydrothermal treatment leads to formation of crystalline zeolites with a low silica content, such as analcite. Very good results have been obtained with a $SiO_2/Al_2O_3$ ratio of 10.7 to 11.7.

According to the process of the invention, a cogel of aluminum hydroxide on silica hydrogel is prepared, preferably by precipitating in an aqueous medium an aluminum hydroxide on a silica hydrogel by addition of an aluminum compound and an alkaline solution. The silica hydrogel may be obtained by any known method, such as hydrolysis of esters of orthosilicates with mineral acids, or of silicon tetrachloride with cold methanol in water. It is, however, preferred to use alkali metal silicates for the preparation of the silica hydrogel. In a preferred method the cogel of silica and alumina is obtained by precipitating a silica hydrogel from an aqueous solution containing silicate ions by the addition of a mineral acid, then adding to the solution an aluminum salt and subsequently precipitating the aluminum hydroxide gel by adding the alkaline solution. Water glass is suitable for the suitable for silicate-ion-containing solution.

Any mineral acid capable of precipitating a silica hydrogel from an aqueous silicate-ion-containing solution can be used. It is preferred that the acid cation be the same as that from which the aluminum salt to be used has been derived. When, for instance, aluminum choride is used, it is preferred to use hydrochloric acid.

Aluminum salts that are soluble in water are preferred, such as aluminum sulfate, aluminum nitrate or aluminum chloride, or mixtures thereof. Preferably the aluminum salt is added to the aqueous solution, either in solid form or as a solution, before addition of the alkaline solution to promote a homogeneous precipitate of aluminum hydroxide gel.

Sodium hydroxide and potassium hydroxide are suitable for the alkaline solution, however, other alkali metal hydroxides and alkaline earth metal hydroxides can be employed. It is, however, preferable to use weak alkaline solutions, especially an aqueous ammonia solution. Although an excess of the alkaline solution is not especially detrimental, alkaline addition should normally be stopped when no further precipitate is formed.

It is desirable to add the alkaline solution in increments, preferably with thorough stirring. Incremental addition is advantageous to distribute the aluminum hydroxide more homogeneously on the silica hydrogel and to avoid local over concentrations.

Best results are obtained when the silica hydrogel is aged for a period of at least 5 minutes before preparation of the cogel. Ageing may take place at or slightly higher than the temperature of the solution during the preparation of the silica gel. Ageing temperatures of between 20° C. and 75° C., preferably between 25° C. and 40° C., for 5 to 1,500 minutes have proved suitable. Ageing of the silica hydrogel takes place at a pH of the solution of between 4 and 7.

The concentrations of the silicate and aluminum compounds solutions can vary between wide limits, such as from 1 percent wt. to 35 percent wt. It is, however, essential that the relative quantities of these solutions are such that the silica/alumina molar ratio in the cogel is between 9.5 and 12.5 and preferably between 10.0 and 12.0.

Dilute solutions of mineral acids and alkaline solutions are desirable. In general, solutions with a normality of between 5.0 and 10, are preferred.

After the formation of the cogel the precipitate is separated from the liquid, for example, by filtration, decantation or otherwise. The separated precipitate is washed with ion-free water and dried. Drying temperature should be at least 100°C. If desired, the cogel may be calcined, for example, at temperatures of from 450° to 600° C. for 1 to 16 hours. Calcination of the cogel does not, however, offer additional advantages and may be omitted.

Commercial cracking catalyst may be used instead of a cogel according to the process as described above if the catalyst produced has a low alumina content. Such cracking catalysts usually have an alumina content of about 13.6 percent wt. and are also obtained as a cogel.

In heating the cogel under autogenous pressure in the alkaline solution that has an alkali content according to the relation discussed above, there is an inverse relation between the duration of heating and the temperature employed. At lower temperatures, it will be necessary to heat for a longer time to obtain a certain minimum conversion into mordenite. Preferably heating under autogenous pressure is continued for sufficient time that the cogel is at least 20 percent converted into mordenite. It has been found that temperatures of from 180° to 260° C., especially from 200° to 230° C., and heating periods of from 4 to 40 hours, especially from 8 to 20 hours, are very suitable.

The mordenite obtained according to the process of the invention has a very fine crystalline structure. The size of the crystals is from 0.1 to $10\mu$ and the crystalline product has the appearance of a fine powder. For various applications of the mordenite it is often desirable that the mordenite be formed in larger particles. For this purpose this mordenite may be mixed with an inert binder. This technique is well known in the preparation of, for instance, catalyst carriers and need not be described in greater detail. Acceptable inert binders include bentonite, kaolin, or clays of the bentonite or kaolin type.

Mordenite produced according to the invention may be used for various applications, such as molecular sieve for the separation of hydrocarbon mixtures as well as for the separation of gases and as catalyst carriers and the like. Mordenite prepared according to the invention is very suitable as catalysts because of its high degree of crystallinity and purity. Very good isomerization catalysts are obtained by incorporating the mordenite with metals of groups VIB, VIIB, and/or VIII of the Periodiç Table of Elements. The ability of the mordenite, properly incorporated with a metal component, may be utilized to determine the purity of the mordenite produced. Higher conversions are obtained in the isomerization of n-pentane as the purity of, and the conversion into mordenite, increases.

The crystallinity of the reaction product and thus the yield of pure mordenite may also be measured by X-ray diffraction. In the following examples that will further elucidate the invention the crystallinity has been determined using Cu-K rays generated at 5 kva. and 36 ma. using an X-ray diffractometer with a rotating container for the sample to be analyzed.

EXAMPLE I

This example demonstrates that higher yield of mordenite is obtained when starting from a cogel according to the invention than when starting from a coprecipitate.

Preparation of a silica-alumina cogel

A 657 g. quantity of water glass (silica content 26.5 percent wt.) was diluted with 2.24 l. of distilled water to obtain a solution with a pH of 11. The solution was heated and at a temperature of 40° C. 6 $N$ nitric acid was slowly added until the pH was exactly 6. In 30 minutes, 260 ml. of acid was added. The silica hydrogel formed was aged at 40° C. for 24 hours with stirring. To the aged silica hydrogel, 191 g. $Al(NO_3)_3.9 H_2O$ dissolved in 115 ml. water was added with stirring causing the pH of the solution to drop from 8.35 to 2.95. The quantity of aluminum salt that was added has been calculated on the basis of a $SiO_2/Al_2O_3$ molar ratio in the cogel of 11.3.

After addition of the $Al(NO_3)_3.9H_2O$, the mixture was stirred for 10 minutes, after which the pH was increased to 4.8 in 10 minutes time by the addition of a 25 percent ammonia solution. AFter another 10 minutes the PH was increased to 5.5. The total consumption of ammonia was 110 ml.

Subsequently, the cogel of aluminum hydroxide on silica hydrogel that had been obtained was filtered and washed with distilled water until no sodium ions could be detected in the wash water. At that stage the cogel contained 0.004 percent wt. sodium that could not be removed by washing. The washed cogel was dried at 120° C. and calcined at 500° C. in air for 3 hours.

Preparation of a silica-alumina coprecipitate

Exactly the same quantities of water glass and aluminum nitrate nonahydrate were used as for the preparation of the cogel. The waterglass was diluted with distilled water to 17.5 l. while 35 ml. of a 25 percent ammonia solution was added. The aluminum nitrate was dissolved in, and diluted with, distilled water to 17.5 l. The two solutions were simultaneously passed into a mixer; the feed rates of these solutions were controlled in such a way that a pH of 8 was maintained in the mixer.

The pH of the coprecipitate formed was brought to 6 with 6 $n$ nitric acid, after which the coprecipitate was aged at 40° C. for 24 hours. After ageing, the pH was raised to 10 by adding a 25 percent ammonia solution. The coprecipitate was then filtered, washed with distilled water, and dried at 120° C. The dried product was washed with a 0.25 percent ammonia solution to remove sodium ions, dried again at 120° C. and finally calcined at 500° C. in air for 3 hours. The calcined coprecipitate contained 0.5 percent wt. of sodium that could not be removed by washing.

Heating with alkali under autogenous pressure

To samples of silica-alumina mixtures obtained according to the methods described above, sodium hydroxide C. distilled water were added to yield a $Na_2O/Al_2O_3$ molar ratio of 1 and a $H_2O/Al_{23}$ molar ratio of 103. An additional 15 mg. of $Na_2O$ per gram of water was added in the form of NaOH. The total quantity of alkali present in the solution expressed as $Na_2O$ was 9.1 grams, calculated on 79 grams of sample.

The solutions prepared in this way were heated at 200° C. under autogenous pressure in a 400 ml. autoclave for 16 hours. X-ray diffraction analysis of these products showed that the silica-alumina mixture obtained as a cogel had been 79 percent converted into mordenite, whereas the coprecipitate was only 6 percent converted into mordenite.

EXAMPLE II

In this example mordenite was prepared from a cogel with a silica-alumina molar ratio of 11.7.

To 4,347 g. water glass solution (silica content 6 percent wt.), 6 $N$ sulfuric acid was added, with thorough stirring, to a pH of 6 in 30 minutes time at room temperature. The silica hydrogel was aged for 15 minutes while being stirred. Next, 459.8 g. of aluminum nitrate solution (alumina content 8.5 percent wt.) was added to the aged silica hydrogel with thorough stirring in 5 minutes. After 10 minutes stirring the pH of the solution was brought to 4.8 in 10 minutes time with a 25 percent ammonia solution. After another 10 minutes stirring the pH was further increased to 5.5. The total consumption of ammonia was 178 ml.

The cogel obtained was filtered and washed three times with distilled water. Subsequently, the cogel was thoroughly mixed three times with 10 liters of distilled water. Finally the cogel was filtered and dried at 120° C. Analysis showed that the cogel contained 0.036 percent wt. of sodium, and had a $SiO_2/Al_2O_3$ molar ratio of 11.7. The cogel had a water content of 12.4 percent wt. as determined by loss of weight on ignition.

Next, 80 g. of the cogel was heated at 220° C. in an autoclave with 10.4 g. NaO in 156 g. of water for 16 hours. The molar composition of the reaction mixture corresponded with $Na_2O.Al_2b83.11.7SiO_2.108\ H_2O+15.8$ mg. $Na_2O/g.H_2O$. The reaction product formed was filtered under pressure, mixed with distilled water and filtered again. It was then washed until the pH of the filtrate was 8–9. The yield, after drying at 120° C., was 76 g. of 91 percent wt. of mordenite. No analcite contamination was shown.

EXAMPLE III

In this example mordenite was prepared from a cogel with a $SiO_2/Al_2O_3$ molar ratio of 10.7.

In the same manner as described in example II a cogel with an $SiO_2/Al_2O_3$ molar ratio of 10.7 was prepared from 4247.5 g. water glass solution (6 percent $SiO_2$) and 512.1 g. aluminum nitrate solution (8.5 percent $Al_2O_3$). The sodium content of the product obtained was lower than 0.01 percent wt. and the water content was 9.6 percent wt.

Subsequently, 82.4 g. of the dried cogel was heated at 220° C. in an autoclave with 11.6 g. NaOH in 174.9 g. water for 16 hours. The molar composition of the reaction mixture corresponded with $Na_2O.Al_3.10.7\ SiO_2.103H_2O+15.0$ mg.$Na_2O/g\ H_2O$. After drying at 120° C. the yield of reaction product was 82 grams: 78 percent mordenite and 2 percent analcite. Analcite was identified by X-ray powder diagram lines which corresponded with those listed for analcite on the ASTM chart 7–363.

EXAMPLE IV

The influence of temperature and heating time on the conversion of amorphous silica-alumina mixtures into crystalline mordenite are demonstrated in this example.

Amorphous silica-alumina samples obtained as cogel as described in example II were heated for several hours at various temperatures between 160° and 220° C. To the total solution to be heated, which had a molar composition of $Na_2O:Al_2O_3:SiO_2:H_2O=1:1:11.3:103$, an additional 15 mg. $Na_2O/g$. water was added. An 80 g. sample of cogel was used for each experiment.

The results obtained, expressed in percent wt. mordenite, analcite and/or amorphous material based on the reaction product, are summarized in the following table.

TABLE I

| | $Na_2O.Al_2O_3.11.3SiO_2.103H_2O$ + 15 mg. $Na_2O/g.\ H_2O$ | | |
|---|---|---|---|
| | | Product composition, percent wt. | |
| Reaction time hours | Temp., °C. | Mordenite | Analcite | Amorphous material |
| 16 | 160 | 0 | 0 | 100 |
| 16 | 170 | 0 | 0 | 100 |
| 16 | 180 | 0 | 0 | 100 |
| 16 | 190 | 18 | 0 | 82 |
| 16 | 200 | 68 | 2 | 30 |
| 16 | 210 | 85 | 0 | 15 |
| 16 | 220 | 90 | 0 | 10 |
| 4 | 220 | 0 | 0 | 100 |
| 8 | 220 | 84 | 1.7 | 14 |

The results show the correlation between heating temperature and time. At temperatures below 200° C. it is necessary to heat for longer than 16 hours, while at 200° C. a product consisting of more than 50 percent of mordenite is obtained in 16 hours. These results also show the high purity of the mordenite obtained.

EXAMPLE V

The influence of additional alkali which, over and above the quantity necessary for a molar $Na_2O/Al_2O_3$ ratio of 1, appears from the following example.

Amorphous silica-alumina samples consisting of commercial cracking catalyst with low $Al_2O_3$ content (13.1 percent wt.) were heated at 200° C. for 16 hours in a solution which had a molar composition of $Na_2O:Al_2O_3:SiO_2:H_2O=1:1:11.3:103$. to this solution an additional quantity of alkali was added ranging between 0 and 40 mg. $Na_2O/g$. water in the total solution. For each experiment a sample of about 80 g. was used.

The results obtained, expressed in percent wt. mordenite, analcite and/or amorphous material based on the reaction product, are summarized in table II.

TABLE II

| Reaction time, hours at 200° C./ mg. Na₂O per g. H₂O | Na₂O.Al₂O₃.11.3SiO₂.103H₂O + mg. Na₂O/g H₂O | | |
|---|---|---|---|
| | Product composition, percent wt. | | |
| | Mordenite | Analcite | Amorphous material |
| 0 | 0 | 0 | 100 |
| 10 | 45 | 3 | 52 |
| 15 | 68 | 2 | 30 |
| 20 | 63 | 3 | 34 |
| 40 | 44 | 46 | 10 |

The results tabulated clearly show that for the conversion into mordenite an additional quantity of alkali expressed as Na₂O must be present in the total solution. Quantities ranging between 10 and 20 mg./g. are conductive to a high degree of purity. At higher excess aklali levels the formation of analcite increases.

EXAMPLE VI

This example demonstrates the suitability of mordenite prepared according to the invention as a carrier for isomerization catalysts.

Several samples with different contents of crystalline mordenite were prepared according to the process described in example IV starting from a total solution with a molar composition of Na₂O.Al₂O₃.11.3SiO₂. 103H₂O+15 mg. Na₂O/gH₂O. The filtered, washed and dried reaction products were loaded in the H± form with a platinum salt. The reaction products thus treated, after having been washed, were dried at 120° C. and then calcined at 500° C. for 3 hours. Before being used for the isomerization tests, the platinum-containing mordenite preparations were reduced in a hydrogen atmosphere. The finished platinum catalysts contained 0.5 percent platinum and were used for isomerization of $n$-pentane. The tests were carried out at a pressure of about 425 p.s.i.a., a space velocity of 1 $1B$ $N$-pentane per $1b$ catalyst per hour and a hydrogen/$n$-pentane ratio of 2.5. The results obtained are given in table III.

These results clearly demonstrate that pentane isomerization conversion increases with the mordenite content in the carrier. Although not detectable with the aid of X-ray diffraction, even the products obtained at temperatures of 170° C. and 180° C., must have contained traces of mordenite, since at 300° C. small amounts of isopentane are formed. The results also show that the activity in isomerization experiments can be used as a criterion for the degree of conversion of amorphous silica-alumina into crystalline mordenite.

TABLE III

| Hydrothermal treatment | | | Isomerization activity | | |
|---|---|---|---|---|---|
| Temp., ° C. | Heating time, hours | Mordenite in reaction prod., percent wt. | Product composition, percent wt. | Temp., ° C. | |
| | | | | 250 | 300 |
| 170 | 16 | Trace | <C₅ | | 2.5 |
| | | | iso-C₅ | | 3.9 |
| | | | n-C₅ | | 93.6 |
| 180 | 16 | Trace | <C₅ | | 4.9 |
| | | | iso-C₅ | | 9.3 |
| | | | n-C₅ | | 85.8 |
| 190 | 16 | 18 | <C₅ | 0.9 | |
| | | | iso-C₅ | 14.1 | |
| | | | n-C₅ | 85.0 | |
| 210 | 16 | 85 | <C₅ | 1.6 | |
| | | | iso-C₅ | 38.3 | |
| | | | n-C₅ | 60.1 | |
| 220 | 16 | 90 | <C₅ | 2.3 | |
| | | | iso-C₅ | 41.9 | |
| | | | n-C₅ | 55.8 | |
| 220 | 16 | *90 | <C₅ | 1.7 | |
| | | | iso-C₅ | 57.3 | |
| | | | n-C₅ | 41.0 | |
| 220 | 8 | *84 | <C₅ | 2.9 | |
| | | | iso-C₅ | 58.9 | |
| | | | n-C₅ | 38.2 | |

* Reaction product treated with boiling hydrochloric acid for two hours before being impregnated with a platinum salt.

We claim as our invention:
1. A process for the preparation of mordenite comprising:
   a. preparation of a cogel of aluminum hydroxide on silica hydrogel having a molar silica-alumina ratio from about 9.5 to 12.5, and
   b. heating the cogel under autogenous pressure in an aqueous alkaline solution having an alkali metal content, expressed as weight alkali metal oxide, Me₂O, in grams equal to $Ax/102+by/1,000$, where A is the molecular weight of the Me₂O; $x$ is the weight of alumina in the cogel, in grams; $y$ is the weight of water in the total solution, in grams; and $b$ is the weight of alkali in milligrams, calculated basis a molar alkali-alumina ratio of 1 present in excess per gram of water and is in a range between 7–30 milligrams per gram of water.

2. The process of claim 1 wherein the cogel is obtained by precipitating an aluminum hydroxide gel on a silica hydrogel in an aqueous medium by addition of an aluminum compound and an alkaline solution.

3. The process of claim 2 wherein the cogel after separation is washed to reduce the alkali content to less than 0.1.

4. The process of claim 1 wherein the cogel is a commercial cracking catalyst with a low alumina content.

5. The process of claim 1 wherein the cogel is heated in a sodium hydroxide solution.

6. The process of claim 1 wherein the total solution contains water in an amount such that the water/alumina molar ratio is higher than 50.

7. The process of claim 2 wherein the cogel is heated under autogenous pressure for sufficient time that at least 20 percent is converted into mordenite.

8. The process of claim 7 wherein the cogel is heated at a temperature ranging between 180° and 260° C. for 4 to 40 hours and the total solution contains a water/alumina molar ratio between 75–175.